Patented Mar. 1, 1938

2,109,934

UNITED STATES PATENT OFFICE 2,109,934

METHOD OF PRODUCING GUANIDINE NITRATE

Harold M. Spurlin, Wilmington, Del., assignor to Hercules Powder Company, Wilmington, Del., a corporation of Delaware No Drawing. Application April 5, 1935, Serial No. 14,800

6 Claims. (Cl. 260—125)

This invention relates to a method of producing guanidine nitrate.

Prior to the development of the method in accordance with this invention, it had been known to produce guanidine nitrate by reacting calcium cyanamide and ammonium nitrate by heating at a temperature of 200° C.–220° C. The procedure used involved first melting ammonium nitrate, then introducing the calcium cyanamide and then heating the mass at 200° C.–220° C. until the reaction was complete.

Now, as a result of my investigations and in accordance with this invention I have found that a mixture of calcium cyanamide and ammonium nitrate will liquefy at a low temperature, around 90° C. and that with a small amount of water added, say one-tenth part of water, the mixture will liquefy at room temperature; and that as a result such mixture, with or without water, may be reacted with the production of guanidine nitrate at a relatively low temperature, as from about 110° C. to about 170° C.

In proceeding for the practical embodiment of this invention, a mixture of calcium cyanamide and ammonium nitrate, preferably, though not necessarily, in powdered form, and preferably, though not necessarily, in approximately the ratio of one mol. calcium cyanamide to three mols ammonium nitrate, will be reacted by heating for a short period, as, for example, 1–4 hours, depending upon the temperature used, at a relatively low temperature, as, for example, a temperature of from about 110° C. to about 170° C. A temperature of about 160° C. will be found to be efficient.

Water may be initially added to the mixture to facilitate liquefaction, if desired, and if added may be added in amount of, for example, from about 0 percent to about 50 percent by weight of the mixture.

The reaction having been completed, the guanidine nitrate product will be readily recovered by cooling the reaction mass, leaching with hot water, filtering and then cooling to cause deposit of crystals of guanidine nitrate.

As more specifically illustrative of the method in accordance with this invention, for example, a mixture comprising 40 parts, by weight, of crude calcium cyanamide and 60–120 parts, by weight, of ammonium nitrate were heated at a temperature of 160° C. for one hour. After cooling the mass was extracted with hot water, filtered hot, cooled, and the crystals of guanidine nitrate filtered off.

In carrying out the above procedure 5 parts of water may be added to the original mixture to facilitate liquefaction thereof.

As further illustrative, for example, a mixture comprising 550 grams of ammonium nitrate and 200 grams of calcium cyanamide when heated at 170° C. for two hours, and a similar mixture when heated at 110° C. for 2 hours, will be productive of guanidine nitrate, which may be readily recovered from the reaction masses by cooling, leaching with hot water, filtering and cooling to effect deposit of crystals of guanidine nitrate.

It will be appreciated that no special form of apparatus is necessary for the carrying out of the method in accordance with this invention.

What I claim and desire to protect by Letters Patent is:

1. The method of producing guanidine nitrate which comprises heating a mixture of powdered calcium cyanamide and powdered ammonium nitrate at a temperature of from about 110° C. to about 170° C. and extracting guanidine nitrate with water.

2. The method of producing guanidine nitrate which comprises heating a mixture of calcium cyanamide and ammonium nitrate in the presence of water in amount not in excess of about 50 percent by weight of the mixture at a temperature of from about 110° C. to about 170° C.

3. The method of producing guanidine nitrate which comprises heating a mixture of calcium cyanamide and ammonium nitrate in the ratio of about one mol. calcium cyanamide to about three mols ammonium nitrate at a temperature of from about 110° C. to about 170° C. and extracting guanidine nitrate with water.

4. The method of producing guanidine nitrate which comprises heating a mixture of calcium cyanamide and ammonium nitrate in the presence of water in amount not in excess of about 50 percent by weight of the mixture at a temperature of from about 110° C. to about 170° C., extracting the reaction mass with hot water, filtering and cooling.

5. The method of producing guanidine nitrate which comprises heating a mixture of solid calcium cyanamide and solid ammonium nitrate to a temperature within the range of from about 110° C. to about 170° C.

6. The method of producing guanidine nitrate which comprises heating a mixture of solid calcium cyanamide and solid ammonium nitrate at a temperature of from about 110° C. to about 170° C. and extracting guanidine nitrate with water.

HAROLD M. SPURLIN.

CERTIFICATE OF CORRECTION.

Patent No. 2,109,934.  March 1, 1938.

HAROLD M. SPURLIN.

It is hereby certified that error appears in the printed specification of the above numbered patent requiring correction as follows: Page 1, first column, line 28 and second column, line 30, claim 3, strike out the period after "mol"; and that the said Letters Patent should be read with these corrections therein that the same may conform to the record of the case in the Patent Office.

Signed and sealed this 5th day of April, A. D. 1938.

(Seal)

Henry Van Arsdale,
Acting Commissioner of Patents.